US006779334B2

(12) United States Patent
Teacherson

(10) Patent No.: US 6,779,334 B2
(45) Date of Patent: Aug. 24, 2004

(54) POWER STROKE ENGINE

(76) Inventor: George A. Teacherson, c/o Box 762, Palm Beach, FL (US) 33480

( * ) Notice: Subject to any disclaimer, the term of this patent is extended or adjusted under 35 U.S.C. 154(b) by 0 days.

(21) Appl. No.: 10/374,327

(22) Filed: Feb. 27, 2003

(65) Prior Publication Data

US 2004/0083729 A1 May 6, 2004

Related U.S. Application Data

(60) Provisional application No. 60/423,450, filed on Nov. 4, 2002.

(51) Int. Cl.[7] .......... F02C 5/00
(52) U.S. Cl. .......... 60/39.6; 60/517
(58) Field of Search .......... 60/39.6, 517, 521, 60/522

(56) References Cited

U.S. PATENT DOCUMENTS 3,678,686 A * 7/1972 Buck .......... 60/521
4,004,421 A * 1/1977 Cowans .......... 60/516
4,037,823 A * 7/1977 Thaeter et al. .......... 254/360
4,068,476 A * 1/1978 Kelsey .......... 60/671
4,327,550 A * 5/1982 Knoos .......... 60/522
4,428,197 A * 1/1984 Liljequist .......... 60/525
5,020,826 A * 6/1991 Stecklein et al. ..... 280/124.159
5,275,002 A * 1/1994 Inoue et al. .......... 62/6

* cited by examiner

*Primary Examiner*—Hoang Nguyen
(74) *Attorney, Agent, or Firm*—George Teacherson, Agent

(57) ABSTRACT

An engine has a piston with plural end faces that compresses combustible mixtures on both sides of the piston and in each end of a closed cylinder containing the piston. The cylinders are fully enclosed with provision for a power takeoff rod to pass therethrough. Each instant closed cylinder with the dual end faced piston can produce power with each and every single stroke of its reciprocating travel. Multiple power generating methods are disclosed, as is a Hybrid type engine utilizing at least two of the multiple methods in a plurality of cylinders.

41 Claims, 5 Drawing Sheets

POWER STROKE ENGINE

This application claims the benefit of prior filed application Serial No. 60/423,450 filed Nov. 4, 2002 of the same name.

FIELD OF THE INVENTION

This invention relates to reciprocating piston engines and more particularly to a piston engine that produces power with each stroke.

BACKGROUND OF THE INVENTION

Steam locomotives had a valve system that fed steam to each side of the piston in the cylinder so that each reciprocating motion of the driving rod received steam power to turn the wheels. No other engine known has ever used both sides of the piston as a power stroke. Prior art pistons have only one end face that contacts the working fluid.

The steam exited the locomotive system in an open cycle.

The power takeoff of the steam locomotives was outside the engine itself, as was its piston rod and driving rod assembly.

Aircraft piston engines have dual spark plugs and ignition systems in only the cylinder heads for redundancy and backup purposes.

Two-stroke diesel engines, as for modern locomotives, are an efficient motive power source and represent state of the piston art. Only one side of the piston is used as an end face.

Some motorcycle engines have standard but opposing pistons that still place combustion on top of the pistons, the end face being away from the main working parts. Those working parts would be, among other necessary things, the crankshaft and/or other power takeoff elements.

Stirling engines, while using no internal combustion, use standard-type pistons to work the internal fluid.

The power takeoffs of prior art reciprocating engines are self-contained within the workings of the engines themselves. Prior art engines are woefully heavy for the power output.

Contrarily, the instant engine is highly efficient and effectively doubles the Horsepower output derived from each cylinder. It, too, is mainly a self-contained engine. Halving the number of cylinders to produce the same amount of Horsepower as prior art engines deliver, more than halves the engine weight and gives a significant increase in power-to-weight ratio than do prior art engines.

An object of the instant invention is to provide a piston engine that produces power with each stroke of the piston.

A further object of the instant invention is to make a "two-stroke" engine into a one-stroke, or power stroke or double-power engine.

Another object of the instant invention is to at least double the number of power strokes of a prior art engine.

A still further object of the instant invention is to provide an engine capable of fulfilling the mission needs of a wide variety of engine applications.

DESCRIPTION OF THE PREFERRED EMBODIMENT

Figure 1:
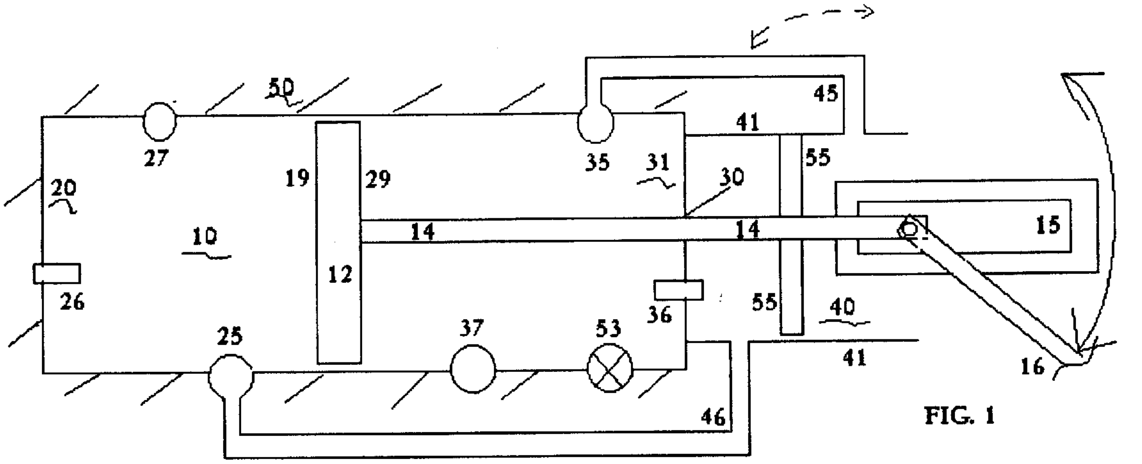
FIG. 1 is a schematic sectional view of a cylinder of the instant power stroke engine.

FIG. 1 of the Drawing schematically shows cylinder 10 of the instant power stroke engine in a cutaway, sectional view. Cylinder 10 is closed at both ends.

In FIG. 1, a cylinder 10 has a two-sided piston 12 and piston rod 14. Rod 14 is attached to slide connector 15 and power connecting rod 16. Power connecting rod 16 as is typical in any engine runs either a crankshaft (not shown) or any suitable power takeoff device as may best be utilized by any particular need, situation or mission of engine 50. Engine 50, as is typical of internal combustion engines, surrounds cylinder 10.

Though slide connector 15 is self contained within engine 50, the manner in which it holds and girdles rod 14 through its stroke is similar to that of the known exterior guide for a steam locomotive piston rod. That connection is known and it is not necessary to display known parts in detail here.

Piston 12 may take any shape (as may cylinder 10) as may be needed for a high-compression, low-compression, normal two-stroke, normal four-stroke, convertible or any other type of engine. Rod 14 may be designed to move piston 12 through any length of travel to accomplish the mission needs of engine 50.

Engine 50 structure in surrounding the shown cylinder 10 as is typical of any modern engine keeps all shown parts internal to engine 50. Thus, unlike a locomotive steam engine, the parts of the instant engine 50 are self-contained.

Rod 14 necessarily reciprocates in a straight line through hole or opening 30 in the "lower" part or area or foot 31 of cylinder 10. Slide connector 15 assures true straight back and forth motion for rod 14 (just as its equivalent did in the steam locomotive era) as it passes in and out of cylinder 10 through hole 30 in lower cylinder 10 foot 31. Power connecting rod 16 moves side to side (solid arrow) as is necessary and typical in prior art piston engines so to deliver useful power to the ultimate nominal power takeoff and/or crankshaft (not shown) of engine 50 and the exterior power using machinery that engine 50 runs.

Cylinder 10 head 20 typically contains at least one of the following: typical fuel port 25, typical spark plug 26, typical exit port or valve 27.

Instant dual sided piston 12 slides suitably within the confines of cylinder 10 having typical means (not shown) for preventing the flow of gasses from one side of the piston 12 to the other. This sliding action may be used as normally done in 2-stroke engines to open and close ports 25 and 27 when suitably designed and placed for that purpose. When designed as typical valves, ports 25 and 27 may take other positions inside cylinder 10. These valve positions may be dictated by the needs of an otherwise-typical four-stroke engine, convertible, 6-stoke or other type as required by the needs of any mission.

No two-sided piston has been used in any self-contained prior art engine.

Lubrication of the instant invention can be accomplished via any suitable manner. Some two-stroke engines mix oil with gas and burn the mixture to accomplish lubrication simultaneously with power generation. This usually is done via the underside of the piston pressurizing the crankcase. The pressure then forces new fuel-oil mixture into the top of cylinder 10 in the area 20. It is then ready for compression on the next up stroke. Since the instant power stroke engine uses both sides of its piston 12 for compression stokes, the instant crankcase preferably should be sealed with a separate oil lubrication system as is done in large diesel engines for locomotives, ships and the like.

Automatic crankcase pressurization as in a typical small prior art 2-stroke gasoline engine can be accomplished in area 40 via optional pressure plate 55. Pressure plate 55 could be sliding within optional extra cylinder 41 which could have optional pressure ports 45 and 46 feeding the cylinder 10 intake ports 35 and 25 respectively. It is to be understood that though shown in FIG. 1 for the purposes of clarity and understanding, the 45 and 46 connections are optional only and other connections known to the prior art and as may be more typical of prior art engines may also be used to feed cylinder 10. With optional cylinder 41 and related ports removed, fuel/oil mixing and compression can be done against the underside of the outside of cylinder 10 in area 40 using plate 55 alone.

Otherwise, the typical large diesel setup of compressing only air within cylinder 10 top 20 and then here, alternately, also bottom 31 in its turn, injecting fuel thereinto via a fueling injector system and letting it burn from the heat of compression, or setting it alight via spark plug 26/36 for lower compression engines, is how the instant engine 50 works to produce power on every stroke. Naturally, prior art methods of mixing fuel with air prior to cylinder 10 injection may also be used in the instant engine.

Prior art engines have separate lubrication systems; use solid lubricants and/or use "slippery" ceramics as coatings for the sides of cylinder 10, piston 12 and rod 14, and here, the opening 30 in cylinder 10 that allows rod 14 to pass through to the outside of cylinder 10. Opening 30 must be impervious to the gasses of combustion, yet freely allow rod 14 to reciprocate therethrough. Fluropolymers are a typical type of ceramic that can be used to seal opening 30, making opening 30 impervious to gas flow while simultaneously allowing rod 14 to freely slide therethrough. Aerospace industry and "high tech" research and development has placed many coatings, materials and even structures into the prior art that may be used herein to seal opening 30 from gasses, yet let rod 14 reciprocate therethrough unhampered.

But the simplest sealing solution for opening 30 is that whatever is typically used to keep the gasses on only one side of a normal sliding piston 12 can also be used to prevent the gasses from exiting through opening 30.

Another type of sealing method could be the use of needle bearings (not shown) in hole 30.

Sealing opening 30 from gas passage is critical to maintenance of combustion pressure in the lower part 31 of cylinder 10. Steam locomotives maintained steam pressure in the equivalent cylinder section, thus it is certainly possible to maintain combustion pressure here as well.

As far as protecting piston rod 14 from the ravages of combustion, whatever is normally designed for typical head or end face 19 of piston 12 is an acceptable coating and/or material for rod 14.

All the above uses standard, known elements and those individual elements need not be described here.

The instant invention takes additional known parts and combines them in the following novel manner.

In addition to the standard top cylinder 10 structures comprising known parts: cylinder head 20, fuel mix entrance 25, spark plug 26, and exit valve or port 27, the instant invention adds a dual sided, dual end-faced 19, 29 piston 12 and closed lower cylinder 10 foot 31 having opening 30 to allow reciprocation of rod 14 to the outside of cylinder 10. These parts, as parts, in and of themselves, are also known and need not be detailed here. These parts are together entirely novel in the instant inventive and novel combination. Top cylinder 20 can be duplicated and attached to itself to form the bottom 31. Thus, otherwise known parts, in combination, form a novel and quite unknown part. Dual-sided piston 12 is not known in the prior art, save for steam locomotives. Generally, it is not known in the art of self-contained engines. It is not difficult to understand from this teaching that known piston head or end face 19 is duplicated and placed upon piston foot 29 forming an additional end face 29 compressing surface for cylinder foot 31.

Thus piston 12, in the instant invention, additionally has piston foot or end face 29 that is also used to compress a gas mixture in preparation for burning.

The rod 14 connection to piston 12 would preferably be permanently enclosed within the confines of piston 12 foot 29. This then makes for a solid, compressing surface 29. Thus, foot 29 would preferably take the same shape as head 19. This is so that compression in both cylinder 10 head 20 and foot 31 are the same and preferably produce the same amount of power per engine 50 stroke. Because rod 14 takes up some volume that is not used up in cylinder 10 top 20 area, the "lower" stroke could be made longer and/or other accommodation could be made to equalize the volume of compressible mixture in the areas of both sides of piston 12. To so equalize the volumes then assures equal power generation on both sides of piston 12. There may be other methods that can assure equal power generation, such as using greater compression on the foot 31 area or still other methods.

The burnable gas mixture enters cylinder 10 foot 31 via port(s) 35. The mixture need NOT have to enter from duct 45. Other, more typical methods of feeding mixture to port 35 are perfectly acceptable. It is then compressed by piston 12 foot 29 and then burned by spark plug 36 in a low-compression engine. In a diesel-type, preferably only air would enter and be compressed. Fuel would then be injected and burned by the heat of compression. The burned gasses would be exhausted through port(s) 37. (Note: Diesel loco types use superchargers or turbochargers to efficiently force the burned mixture out.)

To make the instant power stroke engine operate as a typical two-stroke prior art gasoline engine does, optional pressure plate 55 mounted upon rod 14 outside cylinder 10 would compress the crankshaft area (not shown) and thereby allow operation of the instant invention exactly as small prior art two stroke engines operate. Use of optional ports 45 and 46 of optional extra cylinder 41 to directly compress and Thrust air or mixture into cylinder 10 ports 35 and 25 respectively is another manner of feeding the interior of cylinder 10. Without parts 45 and 46, the crankcase may be pressurized against the outside bottom 31 of cylinder 10 using just part 55. The mechanical and automatic pressurization by plate 55 moves around plate 55 and the fuel/oil mixture of small two-stroke prior-art-type engine 50 can then be thrust up into either intake(s) 25 or 35 as needed by the instant engine 50 cycle. Note that optional plate 55 may also be placed upon rod 16 if so optionally desired. Also, more than one plate 55 may be used. And they may be used in varying positions on the rods.

What the above has just accomplished that is not in a typical prior art self-contained piston engine is to apply full power to the return stroke of piston 12.

Therefore, piston 12 is now receiving a power stoke from the cylinder 10 head 20 portion and also from the cylinder 10 foot 31 portion. So every stroke produces power. This is especially so in a formerly 2-cycle engine. Now in a 4-cycle engine 50, every other stroke could produce power.

Fuel injection or a carbureted mixture can be used herewith.

Power can be produced whenever there is a combustible mixture in either the top 20 portion of the instant invention or in the bottom 31 portion thereof. This would occur in each cylinder 10 of any engine 50 made after the manner of the instant invention and having a dual end faced 19, 29 piston 12.

Note that FIG. 1 shows a push rod 14, 16 connection to the crankshaft. Because of slide connector 15, the engine 50 would be longer than prior art typical engines by the amount of the stroke length. Connector 15 would be as long as necessary to contain the stroke and to support rod 14 along the entire stroke so to assure its true back and forth motion without letting it be bent or otherwise forced out of shape, break or jam. Using a push rod system, connecting rod 16 would osillate per the solid arrow shown.

Since slide connector 15 is as long as the piston stroke, it is no longer necessarily required to place sensors within the cylinder to sense the position of the piston for timing purposes. Piston 12 position within cylinder 10 is mirrored by the distal end of rod 14 as it slides within slide connector 15. Therefore, the distal end of rod 14, whether specifically marked or measurement taken at the literal end will directly indicate piston position within the cylinder 10.

Therefore, whether there are mechanical lifters or other means of working valves, the instant invention gives an easier method, if desired, of timing rather than piercing the hot environment of the interior of cylinder 10.

If however one would prefer to shorten the length of engine 50 over the extended length of the push rod system, a pull rod 14, 16 system can be set up where, preferably without the optional parts to interfere, the crankshaft may be placed side-by-side with cylinder 10 and rod 16 brought upward and off to the side of cylinder 10, rod 14. As rod 14 travels down, it would then pull rod 16 down instead of pushing it, and vice versa. Therefore, rod 16 motion with the crankshaft would then be in the area of the dotted arrow.

Hence, a V-cylinder engine 50 could be designed with the crankshaft between the bank(s) of cylinders or aside either a single cylinder engine 50 or a single bank of cylinders 10 within engine 50. This V-Pull configuration would make the instant engine 50 more compact and maybe even more compact than existing engines. Naturally, in a single-cylinder or single bank of cylinders the V-Pull would refer to the V shape made by rods 14 and 16 as the power takeoff is placed side-by-side with cylinder 10 or bank of cylinders 10.

It may also be possible to make a V-Pull engine 50 when using the optional 2-stroke parts 41, 45, 46 and 55 in place as well.

Figure 5:
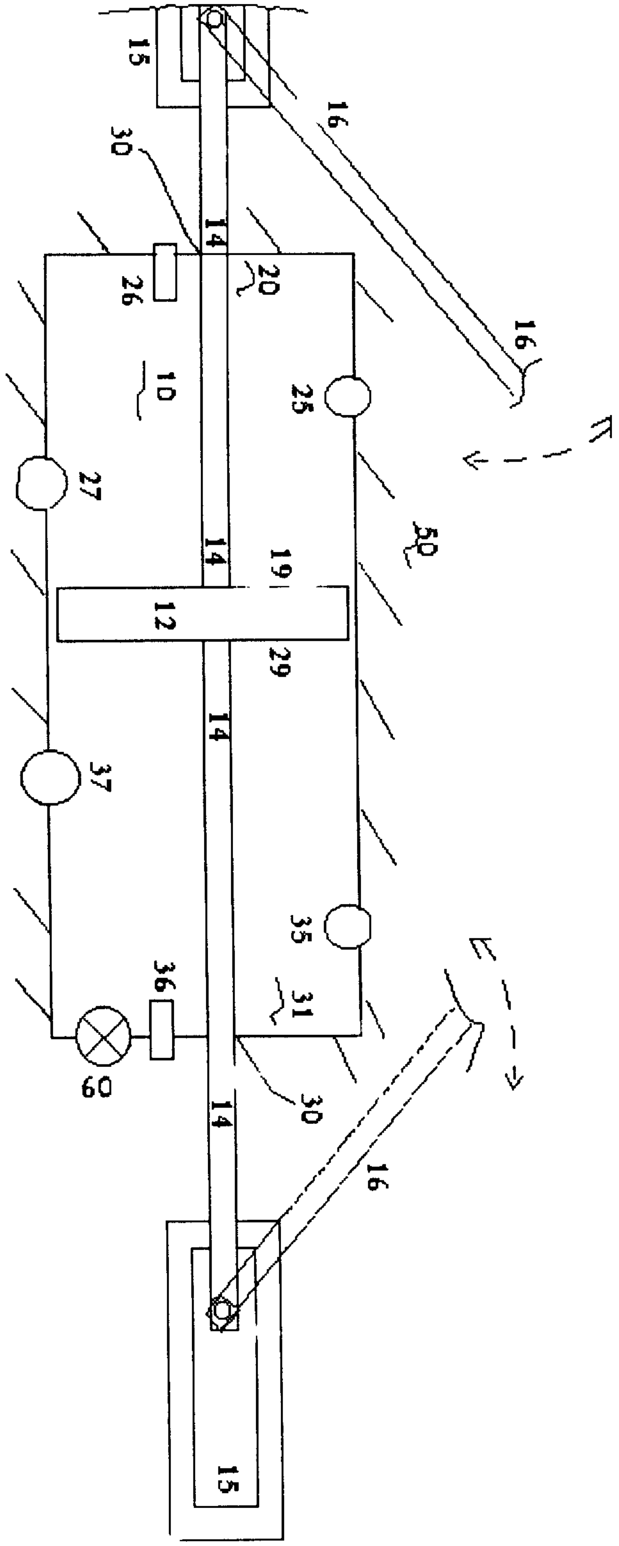
FIG. 5 is a schematic sectional view of the engine of FIG. 1 having dual piston rods.

In V-Pull configuration, see FIG. 5, rod 14 can be duplicated and placed on piston 12 end face 19 as well as end face 29. Thus, dual rods 14 now exit from either side of cylinder 10. Each end 20 and 31 is now fitted with a hole 30 to allow a rod 14 to pass through.

In V-Pull dual rods 14 configuration, the crankshaft or power takeoff (not shown) could then be activated from both sides, top and bottom, in a more equal powering than that from typical one-sided cranking engines. This then might reduce vibration of engine 50 and make it run more smoothly. Dual rods 14 would be used to smooth out the small crankshaft rotational speed variations and thereby reduce engine vibrations. This can also help to reduce torque fluctuations. All-in-all, power takeoff from each side of any piston 12 is useful in performance enhancement.

Another method of shortening the length of engine 50 is to turn sliding connector 15 sideways so that the crank 200 of the crankshaft (not shown) fits within the confines of sliding connector 15 and is directly operated by rod 14 as is currently well known in prior art engines. Thus sliding connector 15 becomes a known scotch yoke or takes the form of a known eccentric bearing race that directly turns the crankshaft in typical known fashion. It itself could be encased between solid walls so to slide up and down as necessary yet never add side forces to solidly connected piston rod 14.

For environmentally friendly purposes, not only does the instant engine 50 have a significantly higher power to weight ratio than prior art engines, but the fuel flow to the cylinders can be regulated such that a graduated charge can be fed to one or even both sides of piston 12 without unbalancing engine 50. The charge of fuel would be regulated to bring a graduated amount into the cylinder per the instant and immediate power needs of engine 50. Since piston rod 14 is absolutely straight, no differing forces on differing sides of piston 12 can unbalance it. In fact, the most unbalanced forces are found in the prior art where there is a massive explosion against the face of the piston and there is absolutely no force at all against the underside of the prior art piston as it comes back up. Hence, a fully but graduated powered stroke is here provided.

Likewise, the instant engine 50 may have a valve 53 at least in the bottom 31 of cylinder 10 for the purposes of opening said bottom 31 at will and taking the pressure off of same. When valve 53 is open, end face 29 cannot compress anything. Thus, the instant engine 50, with fuel flow to bottom 31 stopped temporarily, operates exactly the same as does a prior art engine. This is useful to reduce overall fuel consumption when full power is not needed.

Yet, when an operator demands full power, valve 53 will close, fuel will begin to be allowed to flow with the correct timing and engine 50 will develop the full power capability of the instant power stroke engine 50.

Again, because rod 14 is straight, this on/off of the compression and/or, simultaneously or not, graduating the fuel charge will not unbalance the instant engine.

As stated above, even though not shown in the drawing, it is fully clear that an additional valve 53 may be placed in the top 20 portion of cylinder 10 such that the entire cylinder, both top and bottom, may be taken out of service, its fuel consumption stopped when not needed by power demands, and combustion engine 50 thusly made ecology-friendly.

Spark plugs 26/36 can each be on a separate ignition system for fail-safe operation of engine 50. Should a spark plug fail, a computer [as for instance] can then cut off fuel flow (for best efficiency) to the affected top 20 or bottom 31 portion of cylinder 10 while engine 50 continues to run as a normal engine.

In a multiple-cylinder engine 50, taking a certain amount of cylinders 10 out of service completely will not unduly cool the block, nor unbalance the engine, nor cause additional or excessive vibrations, nor endanger engine life.

Figure 2:
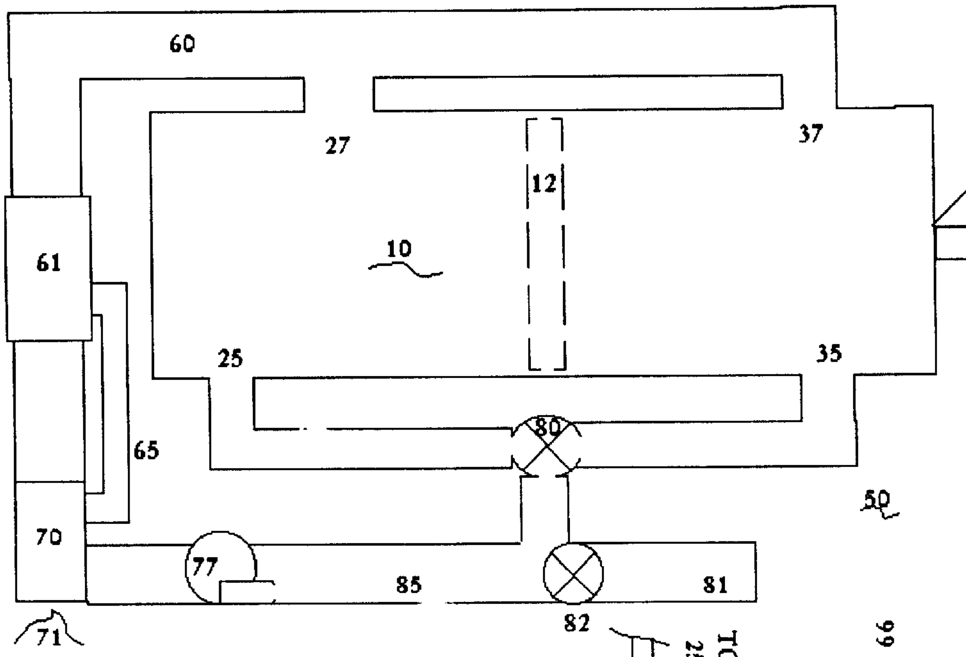
FIG. 2 is an schematic sectional view of the cylinder of the engine of FIG. 1 made into a steam-powered engine.

In a modern-day steam engine 50 generating power internally with self-contained power takeoff(s), FIG. 2, cylinder 10 having the same parts as cylinder 10 of FIG. 1 including lower opening 30 and rod 14 is shown here. Vents 25, 27, 35, 37 are shown in a closed-cycle, efficient heat exchanger system. The heat exchanging means is preferably via use of microchannel technology. Microchannel heat exchangers use significantly less working fluid and give far more heat exchanging capability than traditional designs. Typical flash steam systems are also acceptable for use here.

Fluid exit vents 27, 37 on opposite sides of the instant dual-faced piston 12 feed into a closed-cycle system 60. System 60 has condenser 61 with heat recovery system 65 feeding a heater 70 having heat source 71 and pump, turbocharger, supercharger, etc. 77 feeding into valve 80. Reservoir 81 may be placed into the system 60 to help relieve pressure in the valve 80 working fluid line 85 as may be needed. Valve 82 separates reservoir 81 from line 85.

Valve 80 preferably feeds piston-12-straddling fluid intake ports 25 and 35 alternately. This assures the reciprocating motion of rod 14 per the operation of the instant invention as described heretofore. And each stoke of the dual-end-faced piston 12 is a power stroke.

Since microchannels exchange heat very efficiently and it takes very little fluid to effect that exchange, a working fluid such as water can flash to steam very quickly. And the preferably microchannel heat recovery section 65 helps make the overall system very efficient with very little wasted energy or wasted working fluid. The instant steam engine can process as much working fluid as necessary to power the mission of engine 50.

In an automotive application, the instant steam engine running while the vehicle is stopped can build up steam pressure for easy starting from a dead stop. Also, because of the “flash” steaming capabilities of microchannels, stepping on the power, formerly-gas, pedal would force more working fluid through the microchannels and thus flash more working steam quicker than would prior art heat exchangers. Heater 71 operation can be made to respond to power pedal operations.

Excess steam pressure can be vented to reservoir 81 through valve 82. Less steam pressure is needed to keep vehicular motion going than for initially starting that motion. Preferably electronic controls would keep tabs on the need for steam or working fluid pressure. A heat recovery system (not shown) similar to 65 may be used on the reservoir 81 to feed heat back to heater 77. Also the cooling working fluid inside reservoir 81 may be recovered.

Valve 80 can be like the Johnson Bar valve for steam locomotives. By setting, which cylinder area 20 or 31 gets power first from a dead stop, the vehicle will either go forward or begin backing operations. Preferably, valve 80 is electrically or electronically operated and the entire instant engine 50 may be computer controlled as desired.

Valve 80 feeds each cylinder alternately throughout the operation of engine 50. Like a carburetor, valve 80 may feed all cylinders of engine 50 as needed. Or it may just handle one cylinder 10. Like a steam locomotive’s piston but fully internal, the instant steam engine 50 is a power stroke engine 50.

Figure 3:
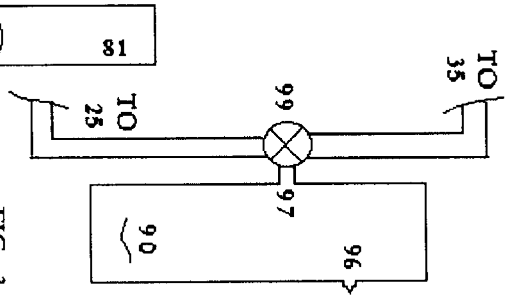
FIG. 3 is a schematic elevation of the power source of the engine of FIG. 1 when used as a purely compressed air or fluid engine.

FIG. 3 shows the compressed air tank 90 of a compressed air engine 50 made after the manner of the instant invention. Tank 90 has air input valve 96 and exit 97. Exit 97 feeds to valve 99, which acts in a manner similar to valve 80 in the steam engine 50 version. Valve 99 directs the compressed air from tank 90 via exit 97 to either cylinder 10 entrances 25 or 35 in their turn. In this manner, a non-combusting compressed air engine 50 may be made lighter in weight with much higher power to weight ratio than existing compressed air engines.

Figure 8:
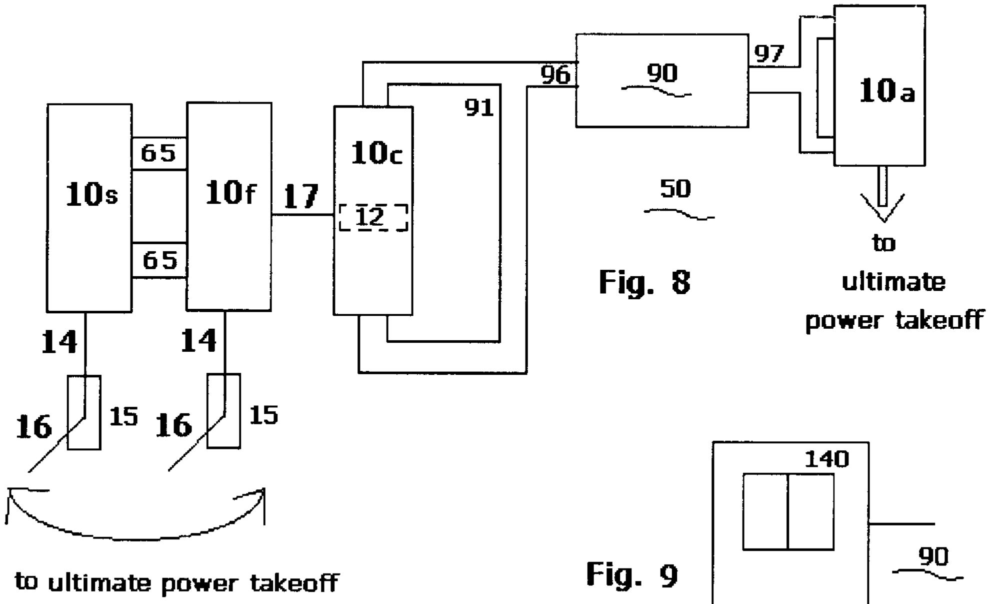
FIG. 8 is a schematic of one version of a hybrid engine.

FIG. 8 shows a hybrid engine 50 made after the manner of the instant invention. Typical instant cylinder 10 is at least duplicated. Here side power takeoff 17 is used to transfer power from the fuel powered cylinder 10*f*, located as the middle cylinder 10 on the left side of the drawing, to the pure compressing cylinder 10*c* to its right. Compressor cylinder 10*c* has dual faced, piston 12 doing nothing more than compressing air for delivery via pipes 91 to air tank 90 intake 96.

Air tank 90 feeds another (air) power cylinder 10*a* through its output 97. The air power cylinder 10*a* then energizes an ultimate power takeoff. This is all according to the teachings of the instant disclosure.

A power cylinder 10 can be in a bank with other cylinders 10, on its own, all as shown, in a V-configuration or operating as desired by a user.

Steam power cylinder 10*s* is located on the far left of FIG. 8. It operates as taught above. Note that heat recovery system 65 here also takes excess heat from fuel power cylinder 10*f* (center 10) and uses the excess heat to create steam for steam power cylinder 10*s*. This configuration produces a single fuel, non-electric hybrid that increases power even more while decreasing overall fuel use in an engine that is half the weight of prior art engines. There has never been a hybrid like the instant one in general. Other hybrid structures are also possible using the instant cylinder structure.

Change the working fluid to water, high-pressure hydraulics or other incompressible fluid and tank 90 can feed a water or other-powered engine 50.

So whether the working fluid is combustion products or not, instant engine 50 can function as a prime mover in any extraordinary number of applications from standard to alternative.

Note that, especially for stationary engines, sunlight may be concentrated, as re: lenses, to provide needed heat source(s). This can be especially useful in, at least, the following application. The following Stirling engine itself can fulfil either a stationary or a moving mission, as can the other versions of engine 50.

Figure 4:
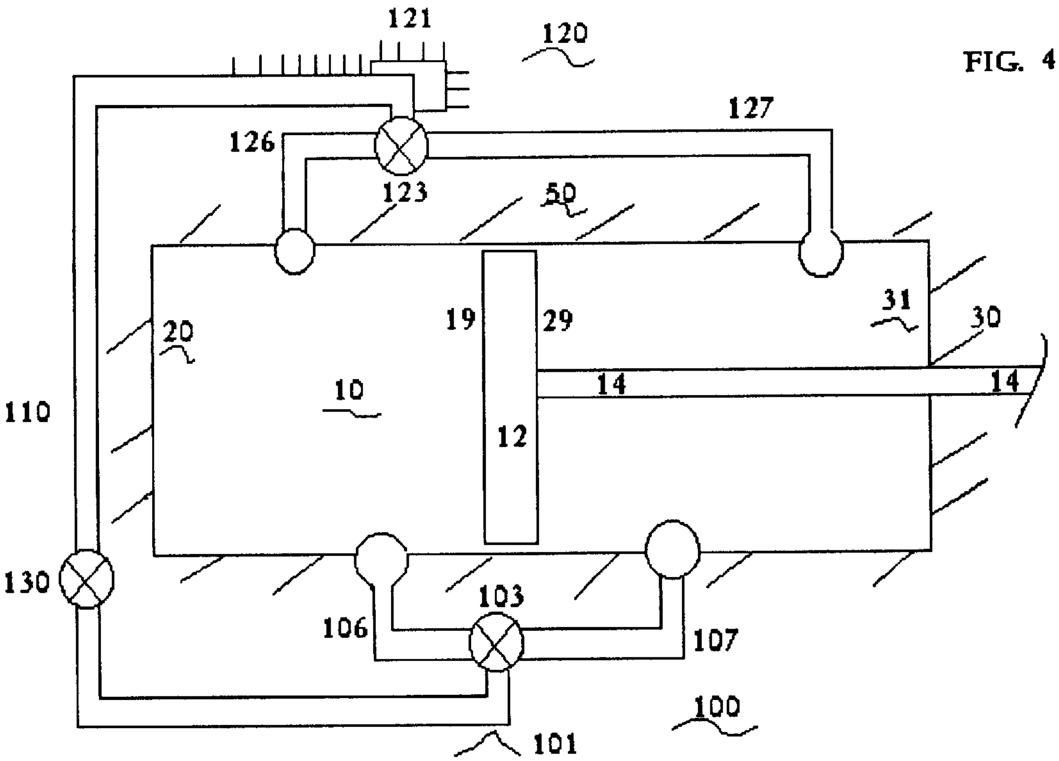
FIG. 4 is a schematic elevation of a Stirling engine made after the manner of the instant invention.

FIG. 4 shows a Stirling engine 50 made after the manner of the instant invention. It, too, borrows a lot from the instant steam engine.

Cylinder 10 has dual end faced 19, 29 piston 12, piston rod 14 exiting cylinder 10 foot 31 through hole 30. Cylinder 10 head 20 is shown closed with no piston rod 14 exiting therethrough. This does not mean that a dual piston rod 14 Stirling engine 50 system cannot be done; it can be done.

Instant Stirling engine 50 uses a closed fluid cycle as do typical Stirling engines. Hot section 100 comprises heat source 101, distribution valve 103 and cylinder feeds 106 and 107. After the manner of the instant invention, valve 103 feeds heated fluid to either side of piston 12 as in its turn. The heated fluid, of course, expands and pushes upon either one of piston 12 end faces 19 or 29 in its turn. Note that in the instant invention, neither side of piston 12 need be heated. No heat is necessarily applied to cylinder 10. The heating is preferably applied to the cylinder 10 input just before valve 103. As stated earlier, microchannel heat exchangers are the preferred structure here. Other types of heat exchangers are acceptable. Valve 103 then directs the heated, expanding working fluid to the piston head 19 or 29 where the work of pushing can be accomplished.

Naturally, the work of pushing on piston 12 head 19 would be accomplished via cylinder 10 entrance 106 while entrance 107 feeds working fluid to foot 29. In this manner, with distribution valve 103, hot section 100 continually provides heat to both sides of piston 12, not simultaneously, but in their reciprocating turn. This has never before appeared in the Stirling art.

Stirling regenerator 110 connects the hot section 101 to the cold section 120. In order to prevent expanding hot working fluid from expanding back into the cold section 120, regenerator 110 has one-way valve 130. Via use of one-way valve 130, hot working fluid flow can be directed to the piston 12 end faces 19 and 29 without the use of moving parts. Regenerator 110 could also have a pump 130 or the like to force working fluid to the hot section if so desired.

Cold section 120 has a cooling heat exchanger shown by fins 121. Note that fins 121 can be placed along regenerator 110 for even greater cooling. Distribution valve 123 opens either side of piston 12. In its proper turn through at least one of each of feeds 126 and 127. By so opening, pressure is taken off the side of piston 12 opposite to that side that is being pushed by the expanding working fluid. So the instant Power Stroke Stirling engine 50 not only relieves pressure from the opposite side of piston 12 but it cools the working fluid exiting from that side as well. Therefore, between removing it from the cylinder and simultaneously cooling and volumetrically expanding the working fluid, the instant Stiring engine 50 is far more efficient than those of the prior art.

Thus, the instant Stirling engine 50 uses the instant dual-sided piston 12 teaching while retaining the closed-cycle Stirling work cycle. It also teaches microchannel heat exchanging. This produces a much more powerful, truly Power-Stroke or Quantum Stroke™ instant Stirling engine with a quantum jump in power generated. With the Stirling piston 12 always under power, Stirling engines may now actually become practical for use in practical mission scenarios.

The so-called Hybrid engine is touted nowadays as being an answer to pollution and environmental problems caused by single-type engines. FIG. 8.

The instant engine 50 can be used as a Hybrid far more simply than any other scheme heretofore presented to the public. In the instant engine 50, no matter what form it takes: internal combustion, steam, compressed air, Stirling cycle; the cylinders are basically the same. Therefore, engine 50 can be made of multiple cylinders 10 where each cylinder 10 can operate in any one of the differing taught modes of operation. Or even a further mode of operation may one day be found. In that case, that or those additional modes of operation may also be added to the cylinder 10 block of instant and future engine 50.

The plurality of cylinders 10 each using a differing power generation method need not necessarily run the same crank 200. But differing cranks may also be connected to the ultimate power takeoff device using known gearing.

And

Hybrid engine 50 could have at least one Internal combustion cylinder 10 matched with any one of at least one of the other three here taught cylinders 10. In this manner, the internal combustion cylinder 10 could be held in reserve producing no power with no fuel flow and both sides of piston 12 carrying no pressure thanks to an open valve 53 on both said sides. When the compressed air cylinder 10 needs a boost, Internal combustion cylinder 10 could either fire up and power the power takeoff or it could be used to compress more air for storage in tank 90, or both. Likewise should Stirling engine 50 cylinder(s) 10 not produce enough power for a situation or mission scenario, internal combustion cylinder 10 could either add to the hot section 100, power the crank 200, fill the compressed air tank 90 or do just two or all three simultaneously.

Similar combinations could be found using the steam cylinder 10. In fact, the three cylinders 10 steam, air and Stirling are most closely related in operation. And such an engine using those three would be very compatible.

FIG. 8 shows just one of such a hybrid system with a steam cylinder 10*s* on the far left, the instant combustion cylinder 10*f* on the middle left, a pure compressor cylinder 10*c* next to it filling tank 90 which operates a power takeoff shown here as a compressed air power cylinder 10*a* operating an ultimate power takeoff. Such a connection and/or number of cylinders 10 are not the only ones available to an instant hybrid engine designer.

Although FIG. 8 shows a side power takeoff 17, it does NOT mean that a V-Pull power takeoff going directly into compressor cylinder 10 is not also useful. That and others is a perfectly valid structural connection.

The ultimate power takeoff can be a turbopump, turbocharger or other useful device. Alternatively, air cylinder 10*a* can also turn the crank with steam efflux from steam cylinder 10*s* turning the turbocharger and/or other devices.

Used air and/or steam can also drive additional turbines for stretching fuel use even further.

Known Hybrids normally have electrical power separate from the fuel engine and that construction can certainly appear here. But if the instant Hybrid runs electricity, the electricity should best be generated as a result of the instant double-faced piston 12 ultimately powering the electrical generator in a suitable manner. This as opposed to the typical heavy battery or expensive fuel cells.

A steam engine 50 could use steam to heat the hot sections of Stirling cylinders 10 before the steam was used in its one or more steam cylinders 10. or the still-hot, but used steam could be used to heat the Stirling cylinders 10.

Steam or Stirling engine 50 could pump up tank 90, keeping compressed air engine 50 operating. Sunlight heating can also be added to the mix.

A number of the like mutual self-help working operations can be devised for the instant Hybrid engine 50.

Figure 6:
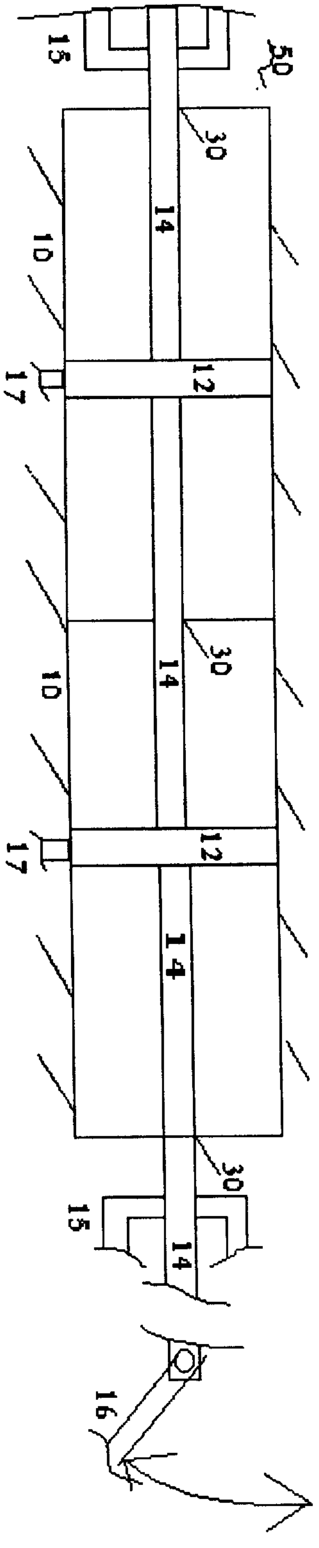
FIG. 6 is a schematic sectional view of a series of connected cylinders made after the manner of the instant invention and connected together by piston rods.

Since FIG. 5 shows a dual piston rod 14 version, it is further possible to use such configuration to create an engine never before seen on earth. FIG. 6 shows an engine 50 having multiple series-connected cylinders 10. The power generated by each cylinder 10 adds to the overall power generated by the engine 50 at the ultimate power takeoff point at the end of the series of mutually connected cylinders 10. FIG. 6 shows only a series of two mutually connected cylinders 10, but it is fully understood that such a long, low and fully cylindrical engine 50 having a greater plurality of such mutually connected cylinders 10 can be designed for specialized applications as needed.

Furthermore, power takeoffs 17 can be placed at intervals along the length of cylinder 10 to extract useful work for wheels, mechanical legs, and other types of ultimate or exterior power using machinery. This can be done so long as proper combustion pressure is maintained within the working side of each piston 12 in long cylinder 10. Such combustion pressure here can be maintained via use of right-angled rings (not shown) or any similar device which would allow the inside opening of cylinder 10 to be covered, remain covered throughout engine 50 operation and so maintain combustion pressure.

Each takeoff 17 can be fitted with plates (not shown) that conform to the walls of cylinder 10 shape and that slide along those internal walls as takeoff 17 slides back and forth. This is another way of maintaining the internal combustion pressure.

Furthermore, series cylinders 10 can themselves be used together in parallel or in banks as may be required for an application.

The instant internal combustion engine 50 power takeoff can be a fully reciprocating one as is well known by steam locomotives. Steam locos were exterior combustion engines having exterior power takeoffs. Contrarily, the instant engine 50 is an internal combustion engine with internal power takeoffs that can also be designed with external reciprocating power-using-machinery instead of the presently typical interior-to-exterior-rotating power takeoffs which then power the ultimate exterior power using machinery.

Figure 7:
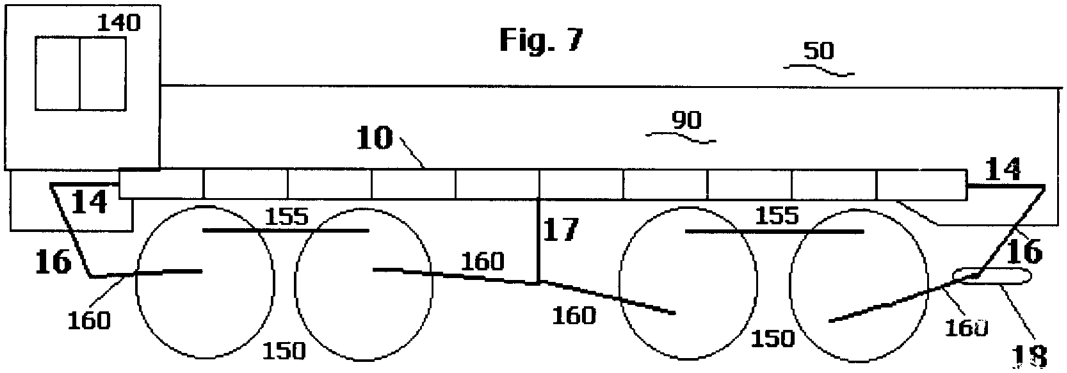
FIG. 7 is a side elevation of an engine with exterior reciprocating output.

FIG. 7 shows an exterior reciprocating power-using machine application. Here water tank 90 feeds at least one series set of steam cylinders 10 as taught above. The head of steam in each cylinder 10 adds up to the final head necessary to drive the driving wheels 150 of the shown modern steam locomotive having cab 140. The ultimate power takeoff is reciprocating driving rods 160 as are well known from prior art steam locomotive engines.

Dual piston rods 14 are shown as for example so to drive dual sets of loco driving wheels 150. Side power takeoff 17 is additionally shown adding its power to the wheels 150. All such power sources 14 and 17 need not be used together as shown. They may be used singly, dually, together or multiply as the number of driving wheel sets 150 require per each loco. Ganging rods 155 on each wheel set 150 assure that all wheels 150 move in unison as is known from prior art steam locomotives. Articulated locos with the cylinders 10 in series on the tank 90 or multiple series on each articulated section are also buildable. Naturally, should it be possible to produce enough head using just one cylinder 10, then only one cylinder 10 is needed and none have to be ganged in series.

Surprisingly, prior art steam locos only needed between 150 and 165 pounds of steam pressure to move entire trains from start to high speed.

Though not shown in FIG. 7 for clarity, sliding connector 15 still keeps piston rods 14 running straight and true. Connecting rod 16 then powers exterior reciprocating wheel driving rods 160 which ultimately run wheels 150.

The right side of FIG. 7 shows exterior sliding connector 18 keeping the distal end of connecting rod 16 straight and true. Ultimate power takeoff, here, driving rods 160, power the wheels 150 exactly the same as that of prior art steam locomotives.

Figure 9:
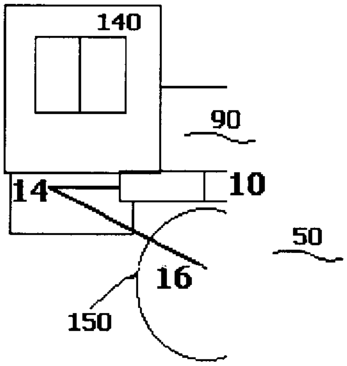
FIG. 9 is a truncated side elevation of a simpler exterior reciprocating output.
Figure 10:
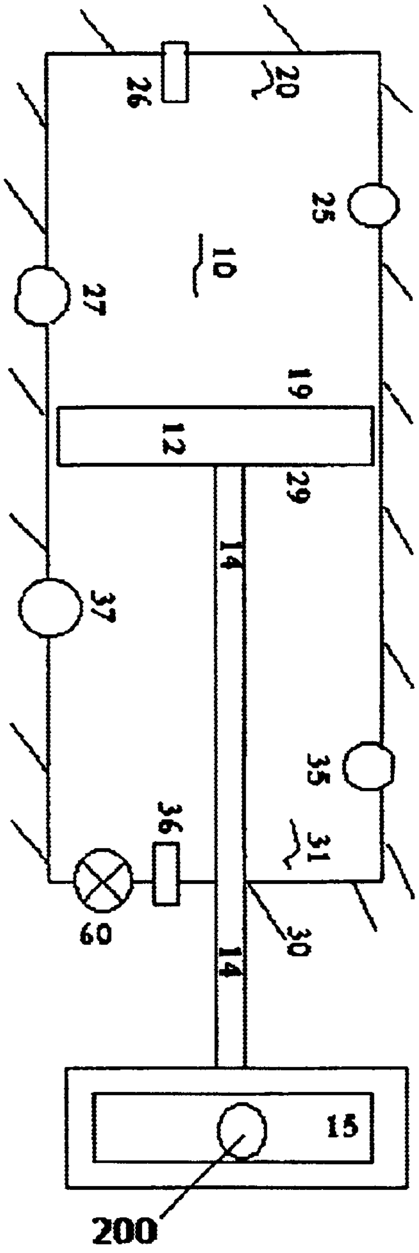
FIGS. 10–11 show other forms of power takeoff to turn the crankshaft.
Figure 11:
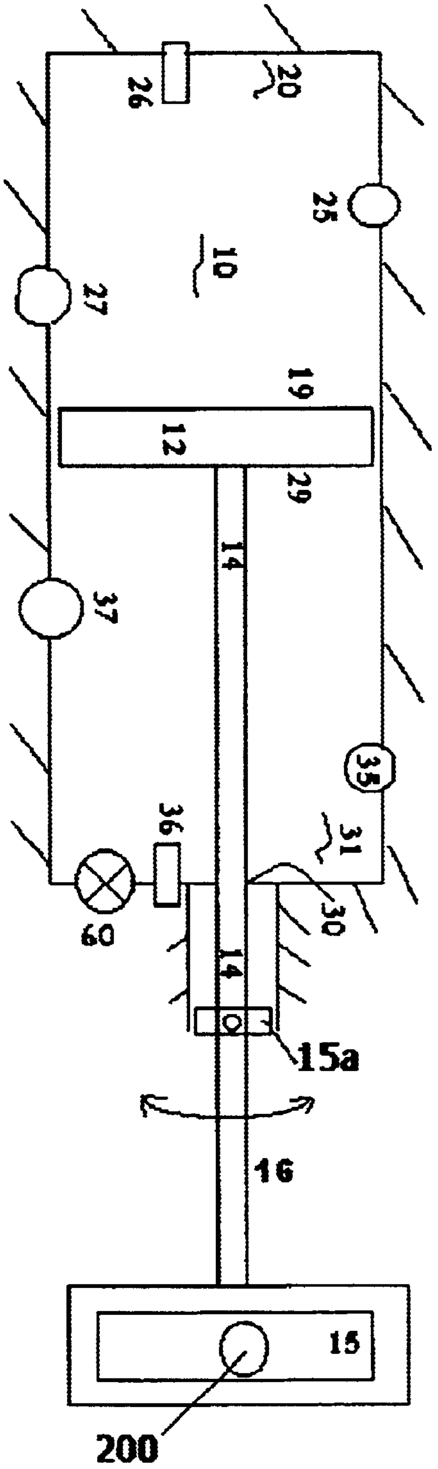

FIG. 9 shows connecting rod 16 directly powering the wheel 150 hubs in a V-Pull configuration. FIG. 9 shows the visual substantial difference between the instant invention and the prior art exterior combustion steam engines. The nonvisual substantial difference being, of course, that the instant engine generates power internally before transferring it to the external rods 160. No prior art even has the structural ability to produce an engine with the FIG. 9 configuration.

Not shown in FIG. 7 is the power takeoff needed to deliver power to the preferred microchannel heat exchangers via, say, driving rods 160. Such could be a cylinder 10 powered electrical generator, turbopump powered electric generator, a spun dynamo, magneto, steam turbine using remainder steam or some other dedicated ultimate power takeoff. Having power pumped up and/or generated via the moving driving rods is known technology from prior steam engines and need not be shown.

Let it be explicitly stated that as the instant disclosure discusses reciprocating motion, the term “reciprocating motion” is not limited to linear reciprocating motion. Future designs are contemplated. Note that some present Stirling designs do reciprocate with angled cylinders.

Thus, the instant engine 50 is now shown to have multiple alternate internal power generating means with a further choice of either typical internal power takeoff or an external power takeoff for exterior power using machinery. The total power generating options make the instant engine a truly universal engine for all environments, needs and missions.

It is a quantum leap in engine technology. It generates at least double the Horsepower of prior art engines/cylinder and can produce only half the pollutants! The instant engine 50 is truly the power solution for the future.

IN OPERATION, the parts shown are well known and can generally even be bought off the shelf in the automotive aftermarket. With relatively minimal changes in structure from prior art engines, the instant Power Stroke engine can Double the Horsepower output from each cylinder 10 of the instant engine 50.

The operation of the instant Power Stroke, double power, Quantum Stroke™ engine 50 begins typically in the cylinder 10 head 20 area where fuel mixture enters the cylinder 10. Spark plug 26 fires and at least one port 27 exhausts the burned gasses. In 4-stroke engines, there are valves 27, timing and other typical engine needs. Typical engines nowadays may even have 4 ports or valves per cylinder—which would translate here to 4 ports or valves per cylinder 10 head 20 AND ALSO PER foot 31. Engine design and valve placement details are not an inventive function of the instant invention. This description shows the novel aspects only of the power stroke engine. Detail engineering of such engines is left to those skilled in the mechanical arts.

Piston 12 moves toward cylinder head 20 compressing the unburned gasses that have been placed therein via port 25. This was done either via fuel injection or via carburetion or via such other method as may be derived. The fuel can be injected into a charge of already-compressed air that has been previously placed into cylinder 10. Piston 12 head or end face 19 may be any shape deemed optimal for operation of the purpose of each engine 50. Likewise, cylinder 10 and crankcase structure and placement may also be optimized for the needs of each engine 50 mission.

As is typical of any such engine, piston 12 compresses the mixture, spark plug 26 burns it and port 27 exhausts it. Upon receiving power from the burning of the gasses, piston 12 moves backwards and pushes rod 14 out of cylinder 10 via hole 30. Whether this is done in 4-stroke, 2-stroke or other manner is not relevant to the instant description. As the rotating machinery (not shown) and located below rod 14 and to which power rod 16 attaches, rotates, it pushes rod 14 back into cylinder 10. The piston 12 is pushed as is typical of normal prior art engines and here its push back into cylinder 10 is greatly magnified by the return power stroke from piston 12 bottom 31 available only in the instant invention.

As rod 14 exits opening 30, bottom end face 29 of piston 12 squeezes an additional combustible mixture placed into the bottom 31 of cylinder 10 via fuel entrance 35. Since the gasses cannot escape through opening 30, compression occurs. Lower spark plug 36 fires and piston 12 is now forced upward with power. Thus a normally 2-stoke powerplant 50 becomes a one-stoke or fully power stoke engine with every stoke generating useful power. A prior art 4-stroke engine now can become at least a two-stroke engine.

Since the pressure of combustion is far stronger than the simple pressure of compression, the instant engine will continue to compress the opposing side of piston 12 as the power side forces the piston to the opposing side of the cylinder 10. Even though the opposing side of piston 12 is feeling increasing pressure as compression proceeds, the combustion shock wave proceeds to expand in the firing side of the piston 12 and cylinder 10 continuing to force piston 12 through its full range of travel. As the engine 50 crankshaft begins to force the rod 16, and thus rod 14, back in the opposite direction, timing will then suitably ignite the fresh compressed mixture on the opposite side of piston 12 and the cycle starts all over again.

The engine weight per power generated goes way down and the number of cylinders 10 needed to give a certain level of power is cut in half. The instant invention is thus far more efficient and far more useful in far more applications than existing engines.

In fact, a single design of an instant invention can be used in far more applications than any prior art designs. And one instant invention can take the place of many differing prior art designs in many differing applications.

Significantly, the teachings of the instant disclosure not only apply to internal combustion piston engines, but also to steam, compressed air, water, incompressible fluids and Stirling engine designs. The instant teachings re-teach the operation of Stirling engines. Instantly, heat does not have to be applied to the cylinder. Far more efficiently, heat is applied, continuously or otherwise, directly to the working fluid as it enters the cylinder preferably either by microchannel heat exchangers and/or via flash steaming type heat exchangers. Similarly, the cool section removes the heat for re-cycling.

With microchannel heat exchanging, both hot 100 and cool sections 120 can be placed into closer proximity than shown in the drawing with a much shorter regeneration section 110 than shown. With microchannel heat exchangers, it is far more efficient to just heat the feed section 101 than to continually heat the entire cylinder as do prior art Stirling engines.

Because of its hybrid capabilities, the instant invention 50 has multiple options of internal power generation. It also has dual capabilities of external power takeoff for exterior power using machinery. No prior art self-contained engine has ever been able to offer these multiple power generation capabilities.

The specification above has endeavored to enable those skilled in the art to make and use the invention while the following peripheral claims are to be used to set the scope and metes and bounds of the disclosure. While it may be possible for those skilled in the art to design equivalent structure to that disclosed herein, the disclosure of one embodiment, to the extent foreseeable to the inventor or beyond, does not discount others as might be envisioned by those skilled in the art. The following claims are meant, whether in original or amended form, to cover the full doctrine of equivalents. The best of the inventor's skill, writing ability and his command of language is never meant to be a limiting factor.

Thus, I claim:

1. A power stroke engine, comprising essentially:

at least one cylinder;

said at least one cylinder closed at both ends;

at least one opening for a piston rod at a minimum of one of said ends;

at least one piston;

said at least one piston within said at least one cylinder;

said at least one piston having two end faces;

at least one piston rod permanently connected to said at least one piston at a minimum of one of said end faces and passing through said at least one opening for a piston rod;

at least one sliding connector for guiding said at least one piston rod;

at least one connecting rod connected to said at least one piston rod;

said at least one connecting rod operating self-contained power takeoff machinery;

said at least one two end faced piston having means for compressing a fluid mixture on each of its said end faces and activating said at least one piston rod for generating power with each stroke of said at least one piston and said at least one connected piston rod;

only one distribution valve feeding said fluid mixture to each side of said end faces of said at least one piston, in turn; and said at least one sliding connector has means for maintaining the true motion of said at least one piston rod through said at least one opening for a piston rod.

2. The engine of claim 1 wherein said cylinder has means for intermittently releasing compression on at least one of said piston end faces inside said cylinder.

3. The engine of claim 1 wherein said self contained power takeoff machinery is located aside at least one of said cylinders; and as desired, has means for being directly operated by said piston rod.

4. The engine of claim 3 wherein said engine is one by which said power takeoff has means for activation by a pulling motion of said connecting rod; and as desired, has said means for being directly operated comprising scotch yoke and eccentric bearing options.

5. The engine of claim 1 wherein said engine is one using combustion products interior to said cylinder.

6. The engine of claim 1 wherein said engine is one using compressed air to activate said piston end faces interior to said cylinder.

7. The engine of claim 1 wherein said engine is one using steam interior to said cylinder to activate said piston end faces interior to said cylinder.

8. The engine of claim 1 wherein said engine is one using a Stirling cycle.

9. The engine of claim 8 wherein said engine has means for keeping working fluid flowing in only one direction through said cylinder.

10. The engine of claim 1 wherein said engine uses microchannel heat exchangers;

as desired, said microchannel heat exchangers use working fluid that changes from liquid to gas during the cycle;

as desired, said microchannel heat exchangers working fluid that changes comprises the water/steam cycle;

said microchannel heat exchangers' working fluid that changes comprises means for cooling more efficiently due to said change;

as desired, said microchannel heat exchangers working fluid is pressurized;

as desired, said microchannel heat exchangers fluid that changes is used to produce multiple alternate internal power generating means; and as desired, said microchannel heat exchangers have means for simultaneously cooling and volumetrically expanding said working fluid.

11. The engine of claim 1 wherein said engine is one having means for regulating fuel flow to a minimum of one of said piston end faces interior to said cylinder.

12. The engine of claim 1 wherein said engine is one using an incompressible fluid within said cylinders.

13. The engine of claim 1 wherein each of said cylinders in the same block is using a differing power generating method.

14. The engine of claim 13 wherein said engine is one using said differing power generating methods for self-help operations.

15. The engine of claim 1 wherein said cylinders are serially connected and as desired, said series has a minimum of one power takeoff along the length of said serially connected cylinders.

16. The engine of claim 1 wherein exterior power using machinery connected to said self-contained power takeoff machinery reciprocates.

17. A power stroke engine, comprising essentially:

self-contained power takeoff;

at least one cylinder;

at least one piston inside said at least one cylinder;

said at least one piston having two opposing end faces;

means for energizing said piston end faces each in reciprocating turn;

said means fox energizing including only one distribution valve feeding said means for energizing to each side of said two opposing piston end faces, in reciprocating turn;

at least one straight piston rod attached to said at least one piston;

sliding connector;

said sliding connector having means for maintaining said at least one straight piston rod straight;

connecting rod attached to the substantially distal end of said at least one straight piston rod;

said connecting rod energizing said self-contained power takeoff;

said self-contained power takeoff energizing exterior power using machinery; and each said piston end face has structural means for reacting to a power expansion of said means for energizing and thus energizing said self-contained power takeoff.

18. The engine of claim 17 wherein said means for energizing said piston end faces is combustion interior to said cylinder.

19. The engine of claim 17 wherein said means for energizing said piston end faces is steam introduced interior to said cylinder.

20. The engine of claim 17 wherein said means for energizing said piston end faces is compressed air introduced interior to said cylinder.

21. The engine of claim 17 wherein said means for energizing said piston end faces is a Stirling cycle activated self-contained fluid interior to said cylinder.

22. The engine of claim 17 wherein said engine is one using a desired combination of Stirling, compressed air, steam, incompressible fluid and combustion as said means for energizing.

23. The engine of claim 17 wherein said engine uses microchannel heat exchangers.

24. The engine of claim 17 wherein said engine has serially connected ones of said cylinders and pistons.

25. The engine of claim 17 wherein said engine has means for intermittently releasing compression on at least one of said piston end faces.

26. The engine of claim 17 wherein said cylinder has means for introducing a graduated charge of said means for energizing.

27. The engine of claim 17 wherein said self-contained power takeoff is located at the side of said cylinders.

28. The engine of claim 17 wherein said self-contained power takeoff energizes exterior reciprocating ones of said exterior power using machinery.

29. An engine, comprising essentially:

at least one closed cylinder with at least one opening on at least one end of said at least one closed cylinder;

at least one piston with dual end faces operating within said at least one closed cylinder;

means for self-contained fully-powered power takeoff from said at least one piston on each powered stroke of said at least one piston;

said means for self-contained fully-powered power takeoff energized via only one distribution valve feeding internal power generating means for energizing said means for self-contained fully-powered power takeoff to each side of said dual end faces of said piston in turn; and said means for self-contained fully-powered power takeoff has means for passing through said at least one opening and ultimately delivering power to exterior power using machinery.

30. The engine of claim 29 wherein said engine has means for releasing the compression on at least one of said dual piston end faces and for providing a graduated charge of combustible mixture thereto as desired.

31. The engine of claim 29 wherein said engine is one using a number of differing said internal power generating means for energizing said Means for self-contained fully-powered power takeoff, and as desired using said differing internal power generating means for self-help in maintaining power for any given application.

32. The engine of claim 31 wherein said internal power generating means includes choices of at least combustion, steam, Stirling-cycle, air, water, hydraulic and incompressible fluid.

33. The engine of claim 29 wherein said engine is one using a V-Pull method of power takeoff, and as desired a direct method of power takeoff.

34. The engine of claim 29 wherein a plurality of said closed cylinders are serially connected and said pistons therewithin each of said closed cylinders are serially connected via said Means for self-contained fully-powered power takeoff.

35. The engine of claim 34 wherein said serially connected cylinders and pistons have a minimum of one power takeoffs spread along the total length of said cylinders.

36. The engine of claim 29 wherein said engine has means for reciprocating an exterior reciprocating one of said exterior power using machinery while maintaining said means for self-contained fully-powered power takeoff.

37. A Stirling engine, comprising:

at least one cylinder;

at least one piston inside said at least one cylinder;

said at least one piston having two end faces;

at least one piston rod attached to said at least one piston and exiting said at least one cylinder on at least one end of said at least one cylinder;

charge of closed cycle fluid;

hot section heating input to said at least one cylinder;

cold section cooling output from said at least one cylinder;

only one distribution valve to feed and remove said charge of closed cycle fluid from either side of said piston in said cylinder in turn;

said only one distribution valve on said hot section feeding heated, expanding said charge of closed cycle fluid to perform work on one side of said at least one piston in turn with Means for preventing hot said charge of closed cycle fluid from backing up into said cold section;

said only one distribution valve on said cold section removing said charge of closed cycle fluid from behind said working one side of said at least one piston in turn to relieve pressure therebehind and for cooling thereof such that said fluid flows in only one direction through said cylinder; and said at least one piston reciprocates within said at least one cylinder having means for allowing hot said working charge of closed cycle fluid, even as desired with and without direct heating of said cylinder, doing work on said piston with Stirling cycle efficiency with means for said working charge of closed cycle fluid continuously being removed from within said at least one cylinder, cooled and recycled by said cold section for use again by said hot section to do said work within said at least one cylinder in cyclical fashion.

38. The engine of claim 37 wherein said engine is one using a plurality of power generation methods within each of a plurality of said cylinders and as required in at least one bank of said cylinders, and as required, in a serially connected bank of said cylinders.

39. The engine of claim 37 wherein said engine uses microchannel heat exchangers.

40. The engine of claim 37 wherein said engine is one using a V-Pull method of power takeoff, and as desired, said cyclical work operates an exterior reciprocating type of power takeoff.

41. The engine of claim 17 wherein the listed elements are directly connected one to the other having no additional pistons, plenum chambers, nor extra gearing and said piston end faces and the volumetric interior of said cylinder ends are size independent; and as desired, said cylinder has means for operating in differing modes of operation.

* * * * *